United States Patent
Stern

(10) Patent No.: US 9,010,126 B2
(45) Date of Patent: Apr. 21, 2015

(54) GAS TURBINE ENGINE WITH VARIABLE AREA FAN NOZZLE BLADDER SYSTEM

(75) Inventor: Alfred M. Stern, Manchester, CT (US)

(73) Assignee: United Technologies Corporation, Hartford, CT (US)

(*) Notice: Subject to any disclaimer, the term of this patent is extended or adjusted under 35 U.S.C. 154(b) by 2184 days.

(21) Appl. No.: 12/033,922

(22) Filed: Feb. 20, 2008

(65) Prior Publication Data

US 2009/0208328 A1 Aug. 20, 2009

(51) Int. Cl.
*F02K 1/06* (2006.01)
*F02K 1/08* (2006.01)
*F02K 1/00* (2006.01)
*F02K 1/10* (2006.01)
*F02K 1/15* (2006.01)

(52) U.S. Cl.
CPC ............... *F02K 1/085* (2013.01); *F02K 1/002* (2013.01); *F02K 1/10* (2013.01); *F02K 1/15* (2013.01)

(58) Field of Classification Search
USPC ........... 60/262, 39.281, 735, 745, 226.1, 785, 60/782, 771, 232, 230, 228; 137/84, 85; 181/213; 239/265.19, 265.43
See application file for complete search history.

(56) References Cited

U.S. PATENT DOCUMENTS

| | | | |
|---|---|---|---|
| 3,279,192 A | 10/1966 | Hull, Jr. et al. | |
| 3,721,389 A * | 3/1973 | MacKinnon et al. | .... 239/265.19 |
| 3,779,010 A | 12/1973 | Chamay et al. | |
| 3,820,719 A | 6/1974 | Clark | |
| 4,312,475 A * | 1/1982 | Edwards et al. | ............ 236/49.4 |
| 4,327,548 A | 5/1982 | Woodward | |
| 5,524,847 A | 6/1996 | Brodell et al. | |
| 5,577,381 A | 11/1996 | Eigenbrode et al. | |
| 5,586,431 A | 12/1996 | Thonebe et al. | |
| 5,593,112 A | 1/1997 | Maier et al. | |
| 5,655,360 A | 8/1997 | Butler | |
| 5,778,659 A | 7/1998 | Duesler et al. | |
| 5,806,302 A | 9/1998 | Cariola et al. | |
| 5,853,148 A | 12/1998 | Standish et al. | |
| 2003/0126856 A1* | 7/2003 | Lair | ............................... 60/262 |
| 2006/0101807 A1 | 5/2006 | Wood et al. | |

FOREIGN PATENT DOCUMENTS

| | | |
|---|---|---|
| EP | 1703114 | 9/2006 |
| FR | 1503425 | 3/1978 |
| GB | 1106077 | 3/1968 |
| GB | 2189550 | 10/1987 |
| JP | 2001050110 | 2/2001 |
| WO | 2008045057 | 4/2008 |

OTHER PUBLICATIONS

EP Search Report, dated Mar. 28, 2012, EP Application No. 09250406.7.

* cited by examiner

*Primary Examiner* — Devon Kramer
*Assistant Examiner* — Vikansha Dwivedi
(74) *Attorney, Agent, or Firm* — Carlson, Gaskey & Olds, P.C.

(57) ABSTRACT

A turbofan engine includes a variable area fan nozzle which effectively changes the physical area and geometry within a fan bypass flow path to manipulate the pressure ratio of the bypass flow with a multitude of bladders circumferentially located about a core cowl.

10 Claims, 3 Drawing Sheets

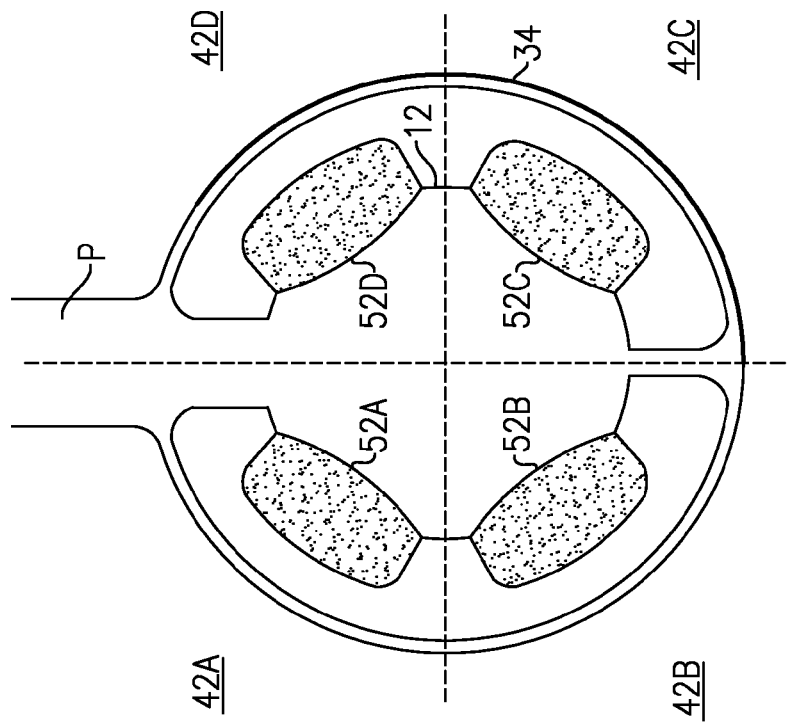
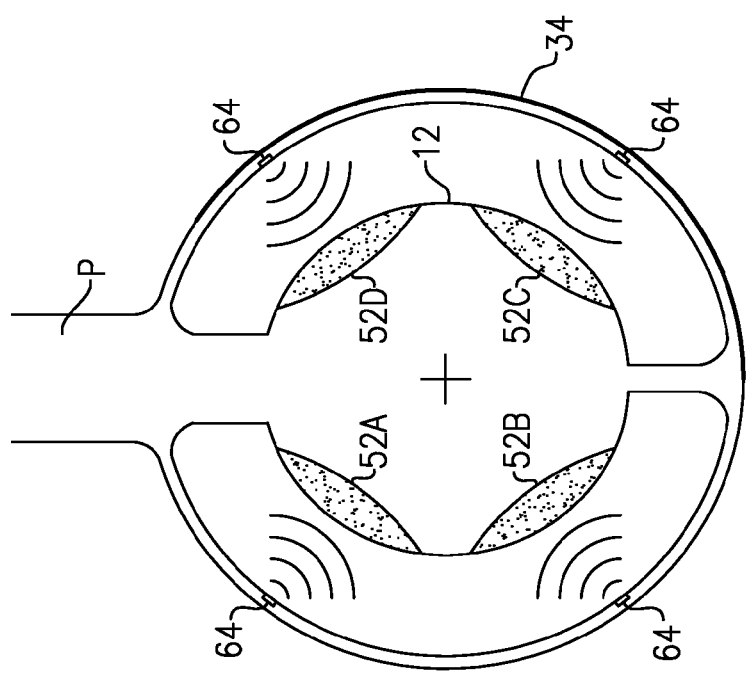

GAS TURBINE ENGINE WITH VARIABLE AREA FAN NOZZLE BLADDER SYSTEM

BACKGROUND OF THE INVENTION

The present invention relates to a turbofan engine having a variable area fan nozzle (VAFN) which includes a bladder system to change a bypass flow path area thereof.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between a fan cowl and a core cowl. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency therefrom may be negated.

SUMMARY OF THE INVENTION

A turbofan engine according to an exemplary aspect of the present invention includes a variable area fan nozzle (VAFN) that changes the physical area and geometry within a fan bypass flow path to manipulate the pressure ratio of a fan bypass flow therethrough. The VAFN generally includes a multitude of bladders circumferentially located about a core cowl within the fan bypass flow path.

The bladders at a fully deflated position (takeoff/landing) take up a minimum of area within the fan bypass flow path to effectively maximize the fan nozzle exit area while in the fully inflated position (cruise) take up a maximum of area within the fan bypass flow path to effectively minimize the fan nozzle exit area of the VAFN.

By adjusting the bladders symmetrically in which all bladders are moved uniformly, thrust efficiency and fuel economy are maximized during each flight condition. By separately adjusting each of the multiple of bladders relative to the other bladders the VAFN provides an asymmetrical fan nozzle exit area such that engine fan bypass flow is selectively vectored.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a rear sectional view of another embodiment of the a gas turbine engine through line 2-2 of FIG. 1A of the VAFN in a deflated position; and FIG. 2B is a rear sectional view of the gas turbine engine of FIG. 2A in an inflated position.

DETAILED DESCRIPTION OF THE PREFERRED EMBODIMENT

Figure 1A:
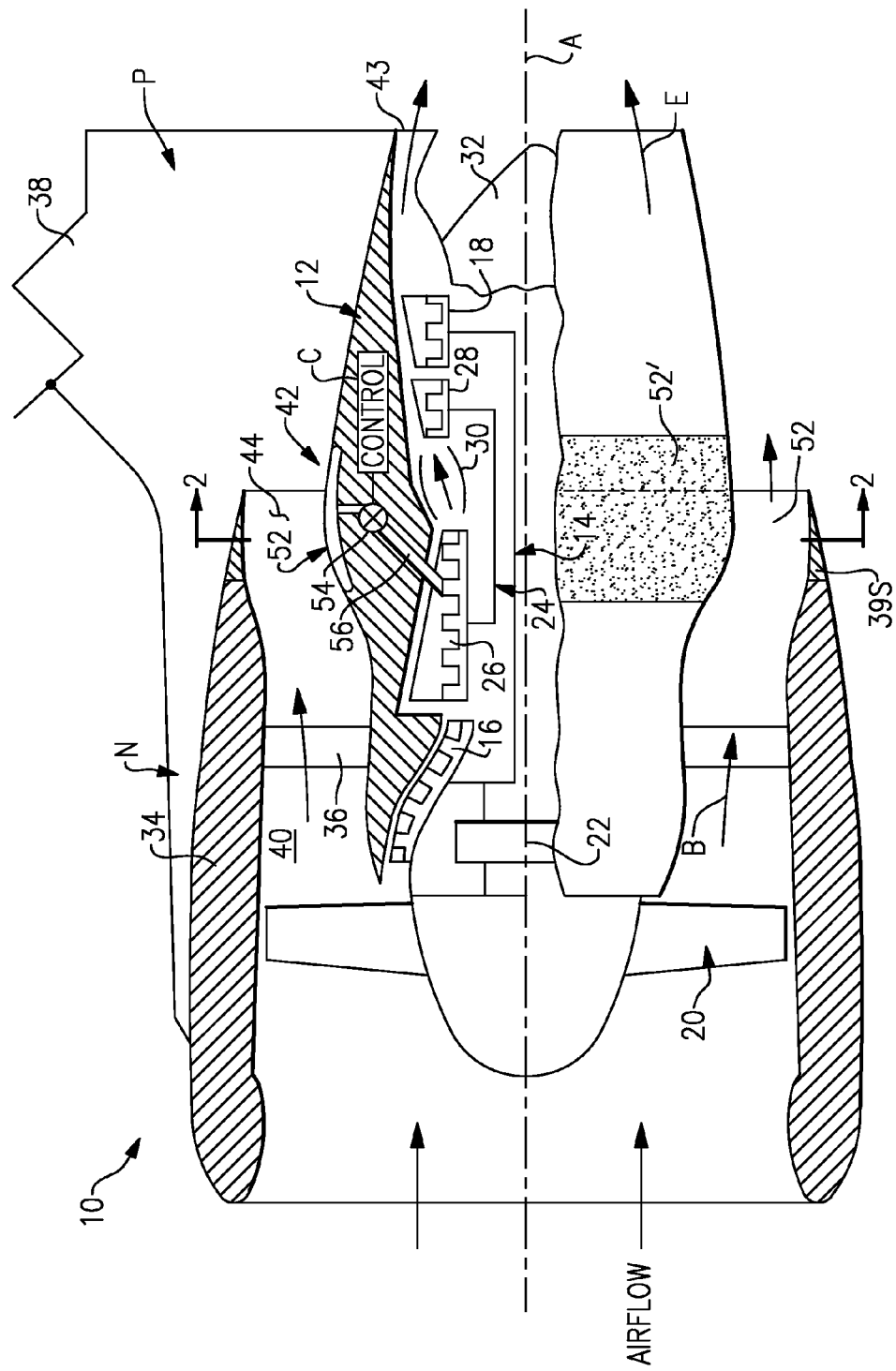
FIG. 1A is a general schematic partial fragmentary view of an exemplary gas turbine engine embodiment for use with the present invention.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core cowl 12 that houses a low spool 14 and high spool 24. The low spool 14 includes a low pressure compressor 16 and low pressure turbine 18. The low spool 14 drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-disclosed embodiment is a high-bypass geared architecture aircraft engine with a bypass ratio greater than ten (10:1), a turbofan diameter significantly larger than that of the low pressure compressor 16, and a low pressure turbine pressure ratio greater than 5:1. The gear train 22 may be an epicycle gear train such as a planetary gear system or other gear system with a gear reduction ratio of greater than 2.5:1. It should be understood, however, that the above parameters are only exemplary of one non-limiting embodiment of a geared architecture engine and that the present invention is applicable to other gas turbine engines including direct drive turbofans.

Airflow enters a fan cowl 34, which at least partially surrounds the core cowl 12. The fan section 20 communicates airflow into the core cowl 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core cowl 12 through a core nozzle 43 defined between the core cowl 12 and a tail cone 32.

The core cowl 12 is supported within the fan cowl 34 by structure 36 often generically referred to as Fan Exit Guide Vanes (FEGVs). A bypass flow path 40 is defined between the core cowl 12 and the fan cowl 34. The engine 10 generates a high bypass flow arrangement with a bypass ratio in which approximately 80 percent of the airflow entering the fan cowl 34 becomes bypass flow B. The bypass flow B communicates through the generally annular bypass flow path 40 and is discharged from the engine 10 through a variable area fan nozzle (VAFN) 42 which defines a nozzle exit area 44 between the fan cowl 34 and the core cowl 12 at a fan cowl adjacent to an end segment 34S of the fan cowl 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the pressure ratio of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 may be designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

The VAFN 42 is operated to the fan nozzle exit area 44 and adjust fan bypass air flow such that the angle of attack or incidence on the fan blade is maintained close to design incidence at other flight conditions such as landing and takeoff to provide optimized engine operation over a range of flight condition with respect to performance and other operational parameters such as noise levels.

The bypass flow B through the fan nozzle exit area 44 is effectively altered through inflation and deflation of the VAFN 42. That is, inflation and deflation of the VAFN 42 effectively changes the physical area and geometry of the fan bypass flow path 40 to manipulate the area through which the bypass flow B must pass. The VAFN 42 changes the physical area and geometry of the bypass flow path 40 during particular flight conditions.

The VAFN 42 generally includes a bladder system 52 with an associated control valve system 54 which controls a bleed air flow communication path 56 from the core engine such as from the low pressure compressor 16, the fan section 20, and/or the high pressure compressor 26. It should be understood that various sources as generally understood may provide the bleed air flow. A flow limiting orifice 58 is located within the bleed air flow communication path 56 to minimize overboard bleed air loss in the event of a leak or rupture in the bladder 52 (also illustrated in FIG. 1B).

The bladder system 52 is located within the core cowl 12 to control the fan nozzle exit area 44. The bladder system 52 may include a multiple of bladders 52A-52D circumferentially located about the core cowl 12 (FIGS. 2A and 2B). Alternatively, the bladder system may include a single bladder 52 may extend about the entire circumference of the core cowl 12. Although four bladders 52A-52D are illustrated in the non-limiting embodiment, it should be understood that any number of bladders may alternatively be provided in the bladder system 52. The bladder system 52 may also be located at a multiple or various axial locations along the bypass flow path 40 to selectively effect the bypass flow.

Figure 1B:
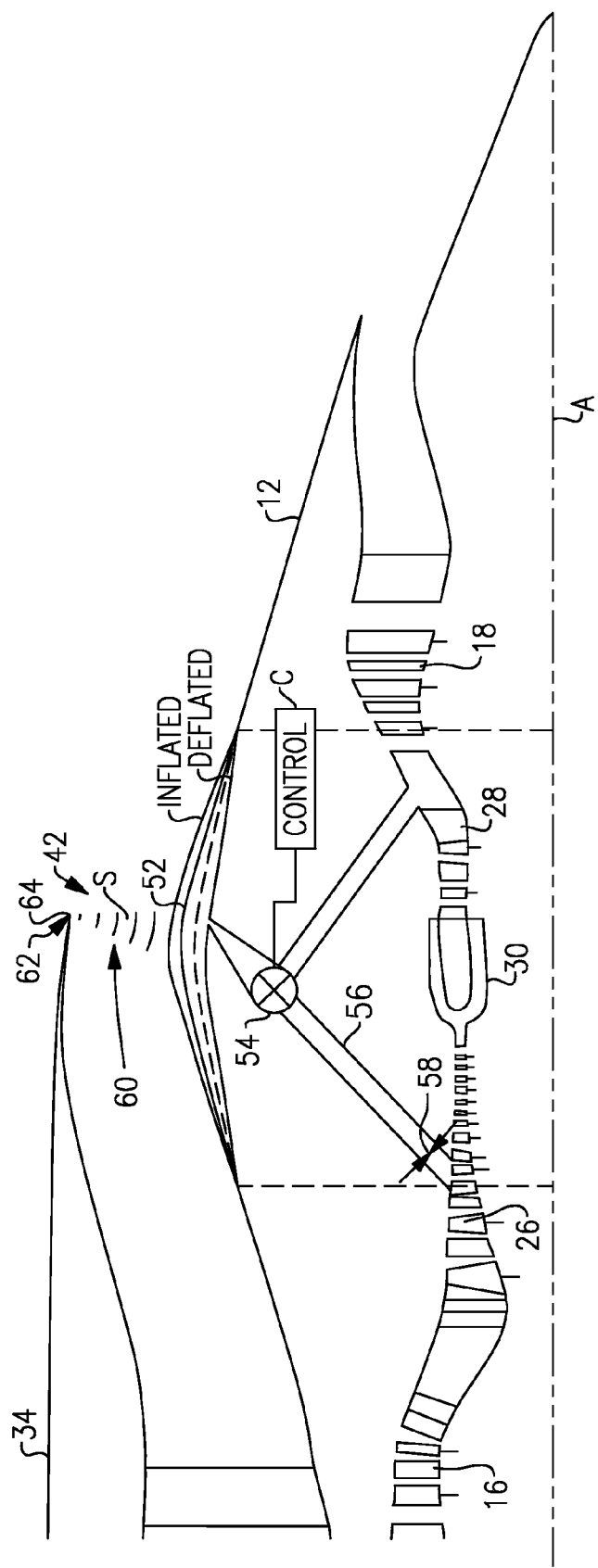
FIG. 1B is an expanded sectional view of the engine.

Referring to FIG. 1B, the position of the VAFN 42 is determined by a controller C which communicates with a positional measurement system 60. The positional measurement system 60 includes a sensor system 62 to measure the position of each bladder 52 or set of bladders 52A-52D through a signal S such as a microwave, radio, optical laser, or other such measurement signal which may, for example reflects off the bladder system 52 to measure the bladder position relative the fan cowl 34. The controller C determines the position of the VAFN 42 in response to the positional measurement system 60 and controls operation of the VAFN 42 though operation of the control valve system 54. The sensor system 62 determines the nozzle exit area 44 by interrogating, for example, the time for the signals to travel and return to, for example, a transceiver 64 associated with each bladder of the bladder system 52. That is, the sensor system 62 may include a multitude of transceivers 64 about the inner diameter of the fan cowl 34 and directed toward the bladder system 52. It should be understood that various positional measurement systems and methods may be utilized with the present invention. It should be further understood that the VAFN controller C may communicate with a higher level controller such as an engine controller, flight control computer, or such like.

The VAFN 42 may provide an approximately 20% (twenty percent) effective change in the fan nozzle exit area 44. That is, the VAFN 42 at the fully inflated position (cruise) takes up a maximum area within the fan bypass flow path 40 to effectively minimize the fan nozzle exit area 44 (FIG. 2B). The VAFN 42 at the fully deflated position (takeoff/landing) takes up a minimum area within the bypass flow path 40 to effectively maximize the fan nozzle exit area 44 (FIG. 2A). An essentially infinite number of positions intermediate the fully inflated and fully deflated position may be utilized for other flight conditions such as climb or maneuvering. It should also be understood that fail safe position of the bladders 52 is the deflated condition such that even if a total pressure loss occurs though a leak or such like, the VAFN 42 will deflate to the takeoff/landing position. Furthermore, by pressure dumping the control valve system 54 the VAFN 42 may be rapidly positioned in the takeoff/landing position.

In operation, the VAFN 42 communicates with the controller C to effectively vary the fan nozzle exit area 44 within the fan bypass flow path 40. By adjusting the bladder system 52 such that all the circumferentially arranged bladders are moved uniformly, thrust efficiency and fuel economy are maximized during each flight condition. By separately adjusting each of the circumferentially distributed bladders 52A-52D (FIGS. 2A and 2B) within, for example, each sectors 42A-42D to provide an asymmetrical fan nozzle exit area 44, engine fan bypass flow is selectively vectored to provide, for example only, trim balance or thrust controlled maneuvering, enhanced ground operations or short field performance.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:
1. A gas turbine engine comprising:
a core engine defined about an axis;
a turbofan driven about said axis;
a core cowl defined at least partially about said core engine;
a fan cowl mounted at least partially around said core cowl to define a fan bypass flow path therebetween;
a bladder system within said core cowl, said bladder system movable between a deflated position and an inflated position to selectively vary said fan bypass flow path, said bladder system forms a flush aerodynamic surface with said core cowl when in said deflated position; and a gear system driven by said core engine, said turbofan driven by said gear system about said axis.

2. The engine as recited in claim 1, wherein said bladder system includes a single circumferential bladder within said core cowl.

3. The engine as recited in claim 2, further comprising a control valve system within a bleed air flow communication path to said bladder system.

4. The engine as recited in claim 1, wherein said bladder system includes a multiple of bladders within said core cowl.

5. The engine as recited in claim 1, wherein said bladder system is in selective fluid communication with said core engine.

6. The engine as recited in claim 5, wherein said fluid is a bleed flow from a compressor section.

7. The engine as recited in claim 5, wherein a bleed flow from said core engine operates to move said bladder system to said inflated position.

8. A gas turbine engine comprising:

a core engine defined about an axis;

a turbofan driven about said axis;

a core cowl defined at least partially about said core engine;

a fan cowl mounted at least partially around said core cowl to define a fan bypass flow path therebetween; and a bladder system within said core cowl, said bladder system movable between a deflated position and an inflated position to selectively vary said fan bypass flow path, said bladder system forms a flush aerodynamic surface with said core cowl when in said deflated position, wherein said bladder system includes a multiple of bladders within said core cowl, wherein each of said multiple of bladders are independently moveably relative said core cowl.

9. The engine as recited in claim 8, further comprising a controller in communication with a control valve system to independently position each of said multiple of bladders in response to a flight condition.

10. The engine as recited in claim 8, further comprising a gear system driven by said core engine, said turbofan driven by said gear system about said axis.

\* \* \* \* \*